United States Patent
Leung (10) Patent No.: US 7,596,630 B2
(45) Date of Patent: Sep. 29, 2009

(54) METHOD, SYSTEM AND COMPUTER PROGRAM PRODUCT FOR PARSING AN ENCODING

(75) Inventor: Lok Yan Leung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1481 days.

(21) Appl. No.: 10/262,054

(22) Filed: Sep. 30, 2002

(65) Prior Publication Data

US 2004/0064587 A1   Apr. 1, 2004

(51) Int. Cl.
G06F 15/16 (2006.01)
G06F 9/45 (2006.01)

(52) U.S. Cl. .................. 709/246; 717/136
(58) Field of Classification Search .............. 709/246; 717/136
See application file for complete search history.

(56) References Cited

U.S. PATENT DOCUMENTS

| | | | |
|---|---|---|---|
| 4,994,998 A | | 2/1991 | Anezaki |
| 5,263,137 A | | 11/1993 | Anezaki |
| 5,418,963 A | | 5/1995 | Anezaki et al. |
| 5,436,627 A | * | 7/1995 | Motoyama et al. ............ 341/67 |
| 5,438,650 A | | 8/1995 | Motoyama et al. |
| 5,506,985 A | * | 4/1996 | Motoyama et al. .......... 715/523 |
| 5,517,622 A | * | 5/1996 | Ivanoff et al. ............... 709/232 |
| 5,524,253 A | * | 6/1996 | Pham et al. .................. 709/202 |
| 5,649,227 A | * | 7/1997 | Anezaki et al. ................ 712/1 |
| 6,081,212 A | * | 6/2000 | Tagato et al. ................... 341/79 |
| 6,119,154 A | | 9/2000 | Weaver et al. |
| 6,523,172 B1 | * | 2/2003 | Martinez-Guerra et al. . 717/143 |

OTHER PUBLICATIONS

International Telecommunication Union (ITU-T); "Series X: Data Networks and Open System Communications"; Information technology—ASN.1 encoding rules: Specification of Basic Encoding Rules (BER), Canonical Encoding Rules (CER) and Distinguished Encoding Rules (DER); Dec. 1997.
International Telecommunication Union (ITU-T); "Series X: Data Networks and Open System Communications"; Information technology—ASN.1 encoding rules: Specification of Basic Encoding Rules (BER), Canonical Encoding Rules (CER) and Distinguished Encoding Rules (DER); Amendment 1: Relative object identifiers; Dec. 1997.

(Continued)

*Primary Examiner*—William C Vaughn, Jr.
*Assistant Examiner*—Ranodhi N Serrao
(74) *Attorney, Agent, or Firm*—Yee & Associates, P.C.; Jeffrey S. LaBaw (57) ABSTRACT

According to a method, system and computer program product for parsing an encoding, a computing device receives an encoding that includes a first level of indefinite length. The first level includes a second level of indefinite length. In response to instructions of a first instance of a parser, the computing device parses the first level. In response to instructions of a second instance of the parser, the computing device parses the second level. The second instance is invoked by the first instance.

27 Claims, 7 Drawing Sheets

OTHER PUBLICATIONS

International Telecommunication Union (ITU-T); "Series X: Data Networks and Open System Communications"; Information technology—ASN.1 encoding rules: Specification of Basic Encoding Rules (BER), Canonical Encoding Rules (CER) and Distinguished Encoding Rules (DER); Technical Corrigendum 1; Dec. 1997.

International Telecommunication Union (ITU)-T; "Series X: Data Networks and Open System Communications"; Corrigendum 2; Dec. 1997.

"ITU-T X.680 Series X: Data Networks and Open System Communications Information Technology—Abstract Syntax Notation One (ASN.1): Specification of basis notation", Jul. 2002, International Telecommunication Union, pp. 1-146.

* cited by examiner

Fig. 7

METHOD, SYSTEM AND COMPUTER PROGRAM PRODUCT FOR PARSING AN ENCODING

TECHNICAL FIELD

The disclosures herein relate in general to information processing systems and in particular to a method, system and computer program product for parsing an encoding.

BACKGROUND

The International Telecommunication Union ("ITU") is the United Nations Specialized Agency in the field of telecommunications. The ITU Telecommunication Standardization Sector ("ITU-T") is a permanent organ of the ITU. The ITU-T is responsible for studying technical, operating and tariff questions and issuing Recommendations on them with a view toward standardizing telecommunications on a worldwide basis.

Abstract Syntax Notation One ("ASN.1") is an information technology standard for communicating between computer applications. ITU-T Recommendation X.690 specifies ASN.1 encoding rules, including specification of basic encoding rules ("BER"), canonical encoding rules ("CER"), and distinguished encoding rules ("DER"). It is implicit in the specification of these encoding rules that they are also used for decoding.

ITU-T Recommendation X.690 is also published as ISO/IEC International Standard 8825-1. ISO is the International Organization for Standardization. IEC is the International Electrotechnical Commission.

With BER, a sender of information has various choices about encoding data values. With CER and DER, the sender has more restrictions than otherwise allowed by BER. CER and DER differ from one another in the set of restrictions that they place on BER.

A key difference is that DER uses a definite length form of encoding, while CER uses an indefinite length form of encoding. In general, (a) DER is more suitable than CER if the encoded value is sufficiently small to fit into available memory, or if there is a need to rapidly skip nested values, (b) CER is more suitable than DER if the encoded value is large and cannot fit into available memory, or if it is necessary to encode and transmit a part of a value before the entire value is available, and (c) BER is more suitable than CER or DER if the encoding contains a set value or set-of value, and if there is no need for CER and DER restrictions. CER and DER may increase memory and CPU overhead to ensure that set values and set-of values have only a single possible encoding.

Because of DER's ease of use, many applications implement a framework to handle DER encoding data only. In order to parse BER encoded data, such DER-compatible applications would need to create another framework. Some applications may handle a single level of BER encoding, but are less successful in handling BER encoding with multiple levels of indefinite length.

Accordingly, a need has arisen for a method, system and computer program product for parsing an encoding, in which various shortcomings of previous techniques are overcome.

SUMMARY

One embodiment, accordingly, provides for a method, system and computer program product for parsing an encoding. A computing device receives an encoding that includes a first level of indefinite length. The first level includes a second level of indefinite length. In response to instructions of a first instance of a parser, the computing device parses the first level. In response to instructions of a second instance of the parser, the computing device parses the second level. The second instance is invoked by the first instance.

A principal advantage of this embodiment is that various shortcomings of previous techniques are overcome.

DETAILED DESCRIPTION

Figure 1:
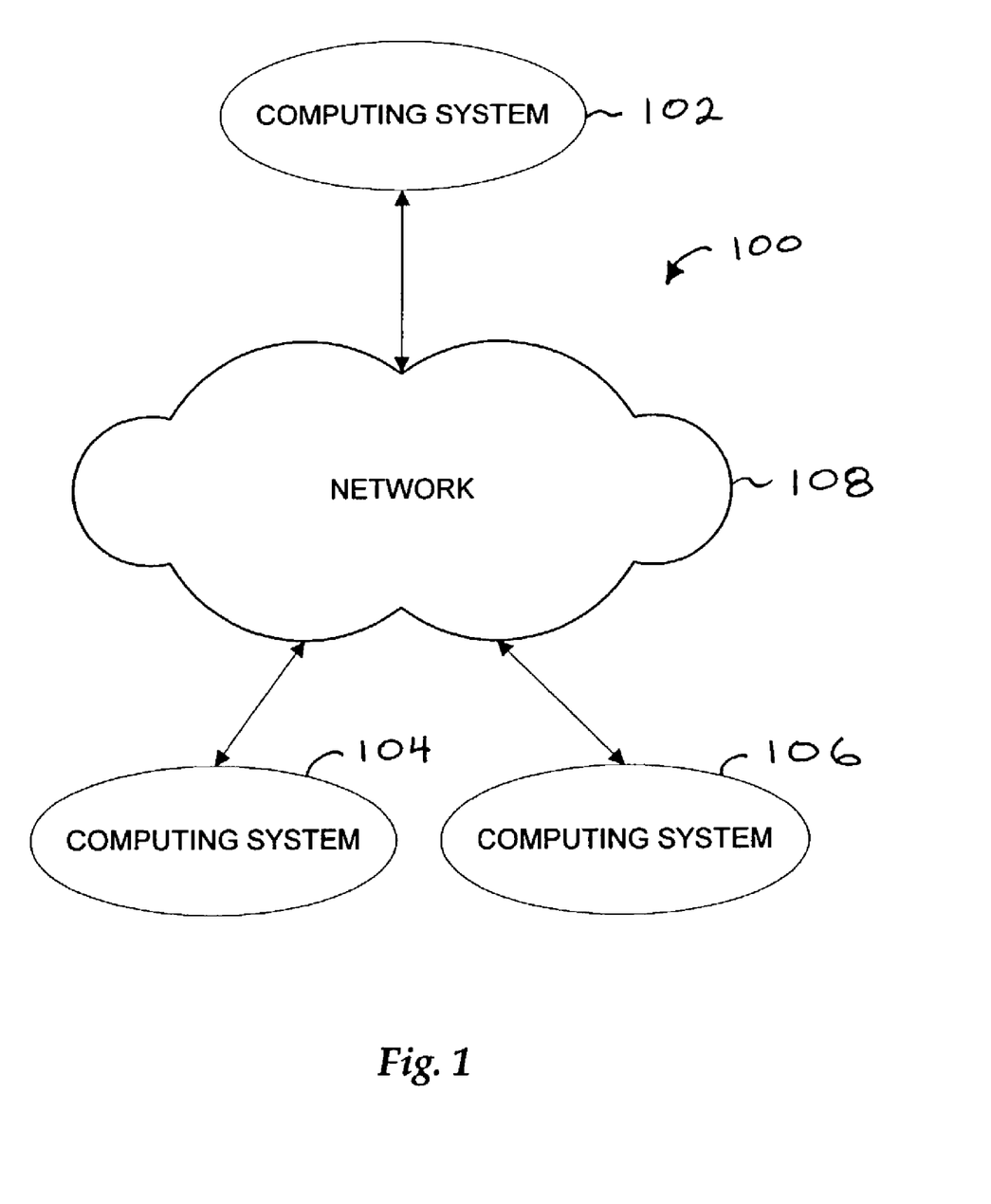
FIG. 1 is a block diagram of a system according to the illustrative embodiment.

FIG. 1 is a block diagram of a system, indicated generally at 100, according to the illustrative embodiment. System 100 includes computing systems 102, 104 and 106, each for executing respective processes as discussed further hereinbelow in connection with FIGS. 3, 4, 5, 6 and 7. Further, system 100 includes a global computer network 108, such as a Transport Control Protocol/Internet Protocol ("TCP/IP") network (e.g. the Internet or an intranet).

Each of computing systems 102, 104 and 106 includes a respective network interface for communicating with network 108 (i.e. outputting information to, and receiving information from, network 108), such as by transferring information (e.g. instructions, data, signals) between such computing system and network 108. Each of computing systems 102, 104 and 106 includes at least one respective computing device (e.g. computer, such as an IBM-compatible personal computers) for executing a respective process and performing respective operations (e.g. processing and communicating information) in response thereto, as discussed further hereinbelow. Each such computing system and computing device is formed by various electronic circuitry components.

As shown in FIG. 1, computing systems 102, 104 and 106 are coupled through network 108 to one another. Through network 108, information is communicated by computing systems 102, 104 and 106 to one another. In the discussion hereinbelow, computing system 102 is a representative one of computing systems 102, 104 and 106.

Figure 2:
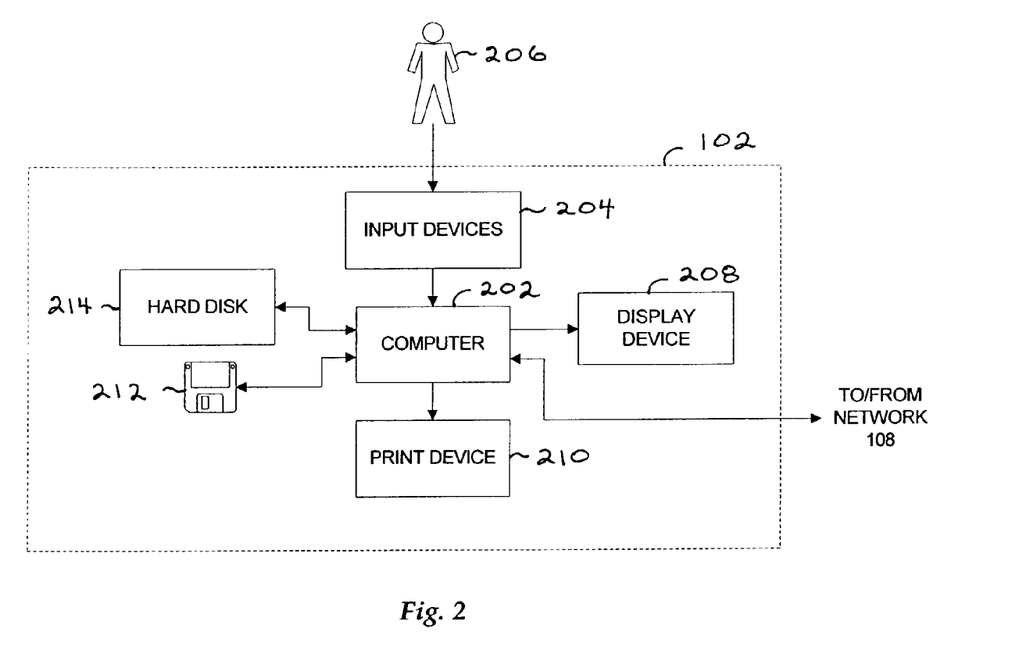
FIG. 2 is a block diagram of a representative computing system.

FIG. 2 is a block diagram of representative computing system 102. As shown in FIG. 2, computing system 102 includes (a) a computer 202 for executing and otherwise processing instructions, (b) input devices 204 for receiving information from a human user 206, (c) a display device 208 (e.g. a conventional electronic cathode ray tube ("CRT") device) for displaying information to a user (e.g. user 206), (d) a print device 210 (e.g. a conventional electronic printer or plotter), (e) a computer-readable medium (or apparatus) 212 for storing information, (f) a nonvolatile storage device 214 (e.g. a disk drive or other computer-readable medium (or apparatus), as discussed further hereinbelow) for storing information, and (g) various other electronic circuitry for performing other operations of computing system 102. Computing system 102 is discussed further hereinbelow.

Figure 3:
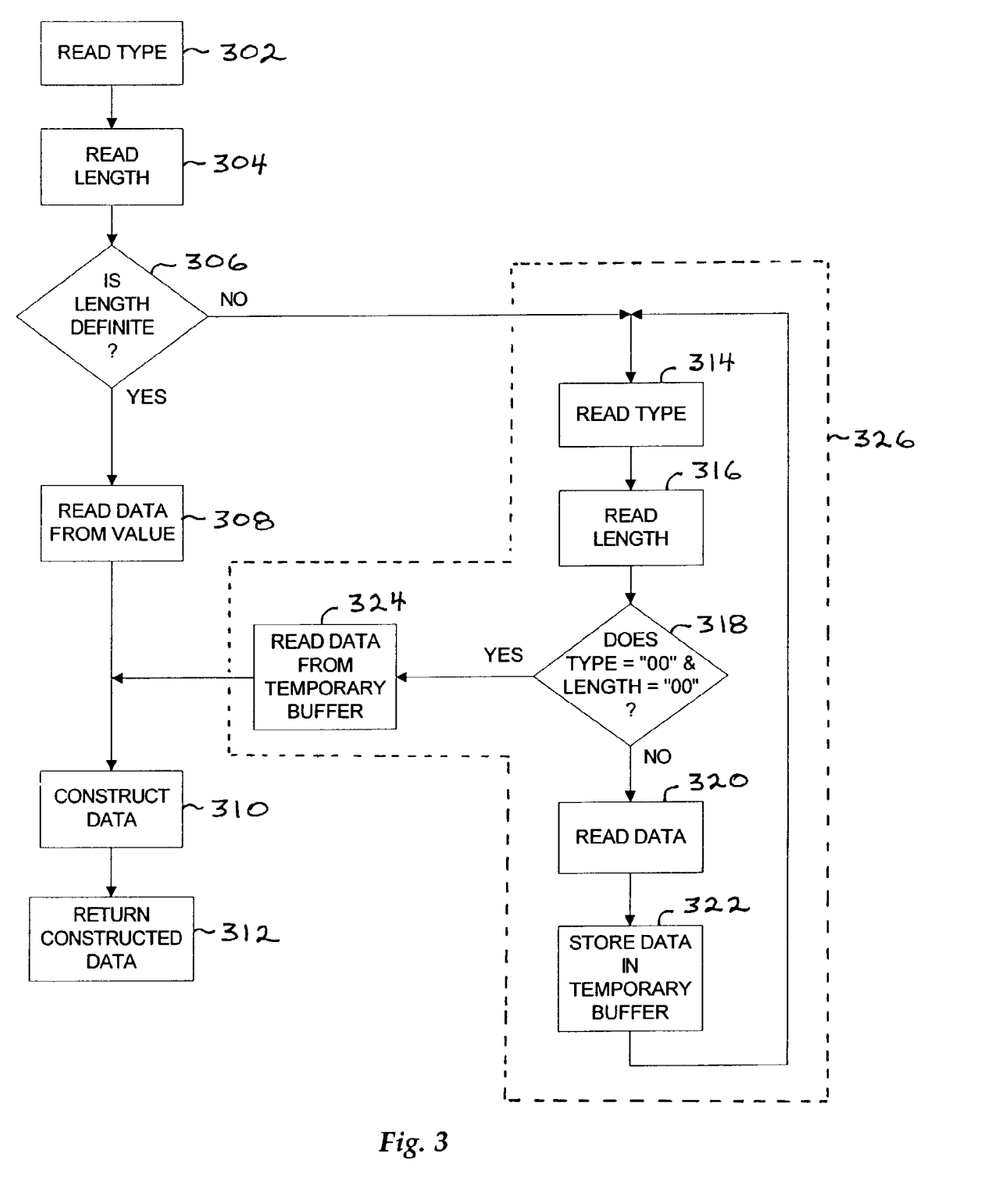
FIG. 3 is a flowchart of a decoding operation, according to a first illustrative embodiment.

FIG. 3 is a flowchart of a decoding (or "parsing") operation, according to a first illustrative embodiment. A computing system performs the decoding operation of FIG. 3, in response to various instructions of a software application. BER, CER and DER encoding includes a Type (e.g. identification or ID) field, a Length field and a Value field, which may be respectively abbreviated as TLV. The Type identifies the nature of the data (e.g. integer, octet string), the Length identifies the length of the data, and the Value includes the actual data. The Type, Length and Value are encoded in byte units.

For example, an octet string '00112233445566778899AABBCCDDEEFF' can be encoded in either a "definite length" format or an "indefinite length" format, as shown below (in hexadecimal format).

Definite length:

| T  | L  | V                                |
|----|----|----------------------------------|
| 04 | 10 | 00112233445566778899AABBCCDDEEFF |

Indefinite length:

| T  | L  | V  |    |                  |
|----|----|----|----|------------------|
| 24 | 80 |    |    |                  |
|    |    | T  | L  | V                |
|    |    | 04 | 08 | 0011223344556677 |
|    |    | 04 | 08 | 8899AABBCCDDEEFF |
|    |    | 00 | 00 |                  |

In this example of the indefinite length format:

(a) the Type is 24, universal class 4, constructed (bit 6 is the primitive/constructed bit, and a value of 00100 in the last 5 bits indicates that the encoding is an octet string);

(b) the indefinite Length is indicated by 80;

(c) the lowest level has definite length constructs in which the Type is 04 and the Length is 08; and (d) the end of data is delimited by a pair of zero octets.

Within the encoding, a level's respective Type, Length and Value fields are associated with one another.

Referring to FIG. 3, the decoding operation starts at a step 302, in response to a call from a computer application, which is executed by a computing system (e.g. computing system 102) that receives the encoding from another computing system (e.g. computing system 104). At step 302, the computing system reads the Type. At a next step 304, the computing system reads the Length. At a next step 306, the computing system determines whether the Length is definite (i.e. whether Length is 80 (base 16 or hexadecimal), which indicates indefinite length instead of definite length).

If the Length is definite, the operation continues from step 306 to a step 308, at which the computing system reads actual data from the Value. After step 308, the operation continues to a step 310, at which the computing system constructs the actual data. At a next step 312, the computing system returns the constructed data to the computer application.

Referring again to step 306, if the Length is indefinite, the operation continues from step 306 to a step 314, at which the computing system reads the next Type. After step 314, the operation continues to a step 316, at which the computing system reads the next Length. At a next step 318, the computing system determines whether the Type is 00 and whether the Length is 00 (i.e. the end of data is delimited by a pair of zero octets).

If the end of data is not yet delimited by a pair of zero octets, the operation continues from step 318 to a step 320, at which the computing system reads actual data (according to the Length) from the Value. After step 320, the operation continues to a step 322, at which the computing system stores the actual data in a temporary buffer (in addition to actual data, if any, already stored in the temporary buffer by previous execution(s) of step 322). After step 322, the operation returns to step 314, at which the computing system reads the next Type.

Referring again to step 318, if the end of data is delimited by a pair of zero octets, the operation continues from step 318 to a step 324, at which the computing system reads actual data (stored by previous execution(s) of step 322) from the temporary buffer. After step 324, the operation continues to step 310.

Figure 4:
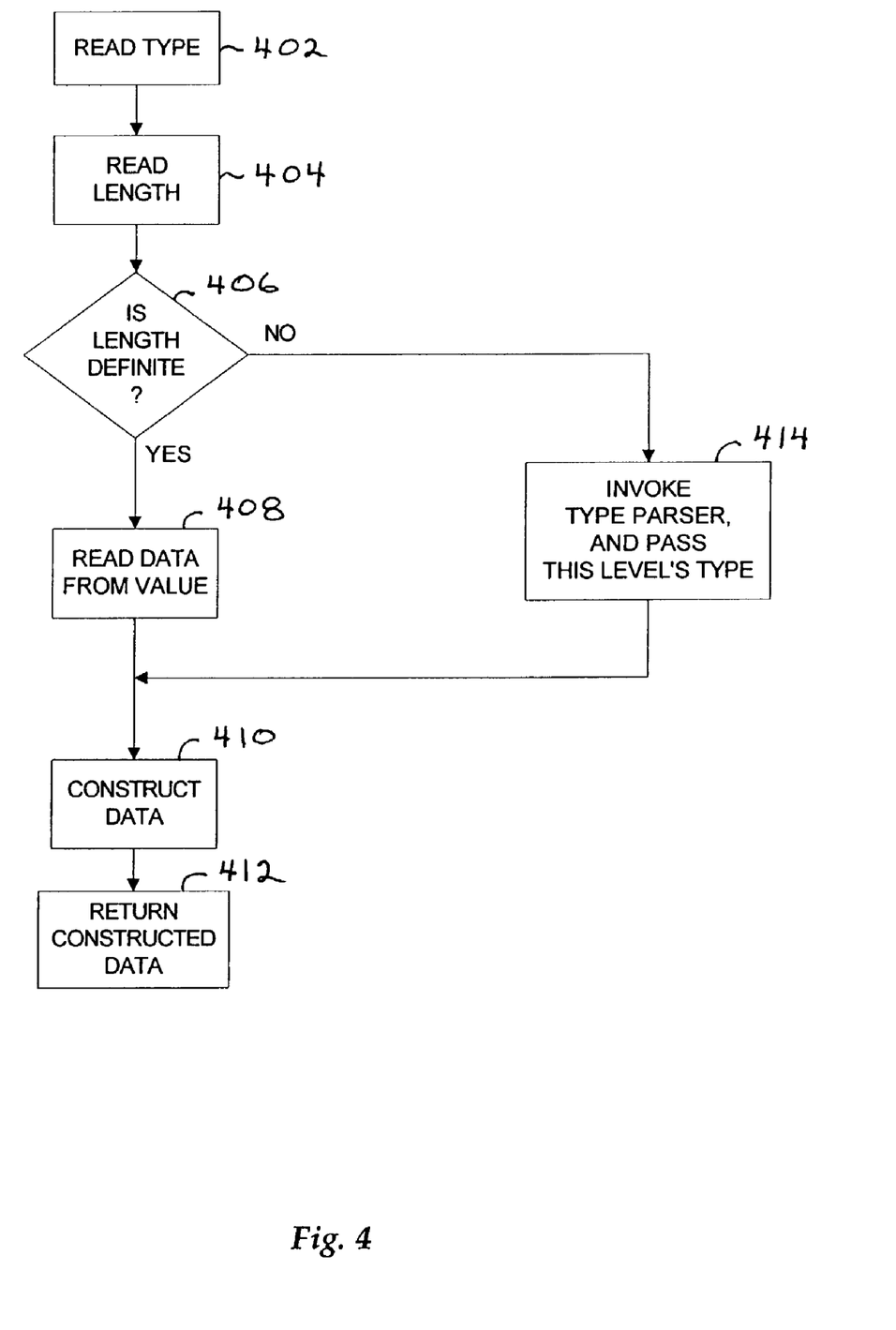
FIG. 4 is a flowchart of a decoding operation, according to a second illustrative embodiment.

FIG. 4 is a flowchart of a decoding operation, according to a second illustrative embodiment. A computing system performs the decoding operation of FIG. 4, in response to various instructions of a software application. In FIG. 4, steps 402-412 are identical to steps 302-312 of FIG. 3. However, in FIG. 4, steps 314-324 of FIG. 3 (indicated by dashed enclosure 326) are replaced with a step 414.

At step 414, the computing system invokes an instance of a "type" parser, which is a software application discussed further hereinbelow in connection with FIG. 5. In the course of invoking this instance of the type parser, the computing system passes (to this instance of the type parser) this level's Type (i.e. the Type of the current level being parsed within the encoding). Accordingly, this level (i.e. the current level) is the "invoking" level for this instance of the type parser. After step 414, the operation continues to step 410.

Figure 5:
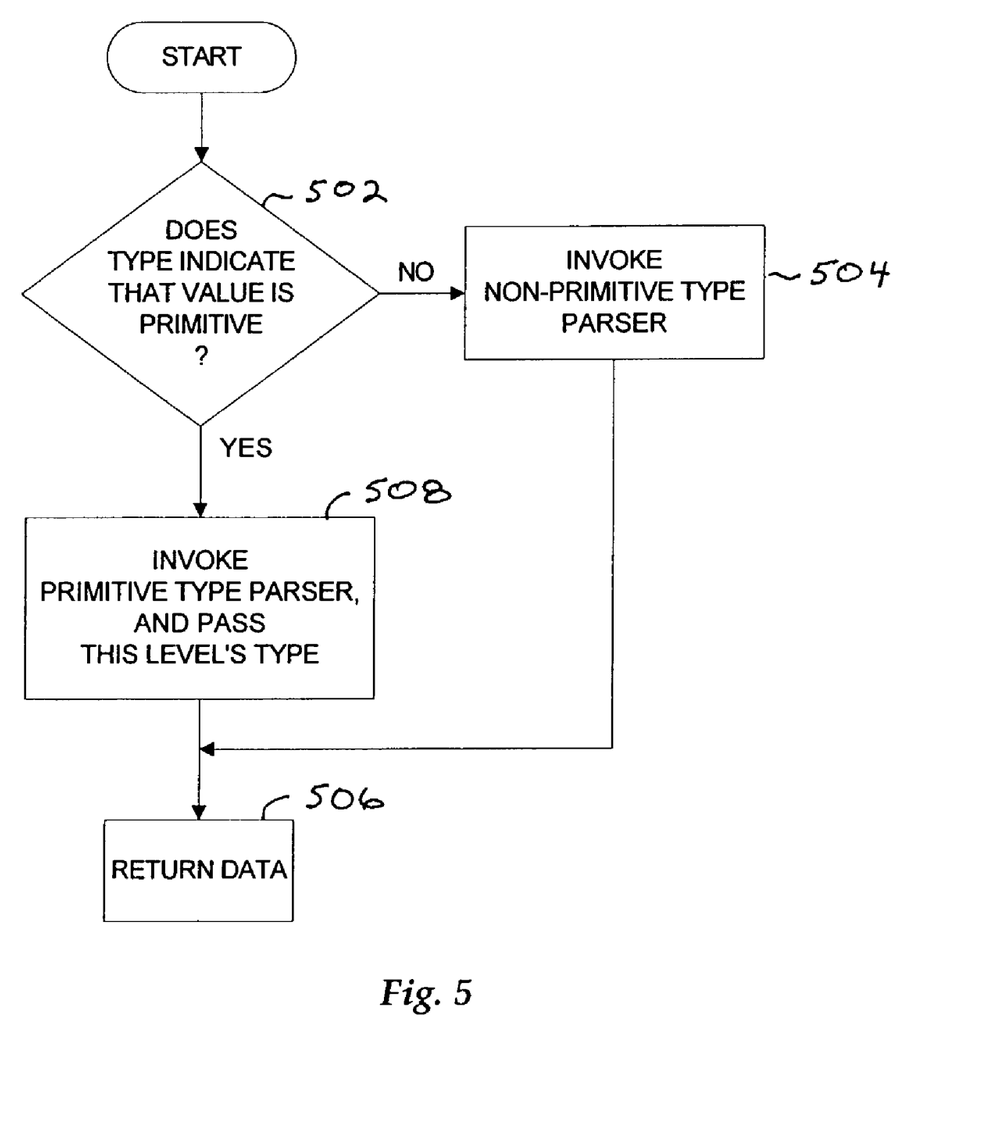
FIG. 5 is a flowchart of an operation of a type parser, according to the second illustrative embodiment.

FIG. 5 is a flowchart of an operation of the type parser, an instance of which is invoked at step 414 of FIG. 4. The computing system performs the decoding operation of FIG. 5, in response to various instructions of the type parser. The operation starts at a step 502, in response to such invocation.

At step 502, the computing system determines whether the invoking level's Type (received at step 414) indicates that its associated Value is primitive. A primitive Value includes only a single type of data, such as "integer" or "octet string." A non-primitive Value may include multiple types of data, such as "sequence."

If the invoking level's Type indicates that its associated Value is non-primitive, the operation continues from step 502 to a step 504, at which the computing system invokes an instance of a non-primitive type parser, which is a software application discussed further hereinbelow in connection with FIG. 7. After step 504, the operation continues to a step 506, at which the computing system returns actual data (stored by execution of step 504) to the step (i.e. step 414 of FIG. 4 or step 716 of FIG. 7) which invoked this instance of the type parser.

Referring again to step 502, if the invoking level's Type indicates that its associated Value is primitive, the operation continues from step 502 to a step 508, at which the computing system invokes an instance of a primitive type parser, which is a software application discussed further hereinbelow in connection with FIG. 6. In the course of invoking this instance of the primitive type parser, the computing system passes (to this instance of the primitive type parser) this level's Type. Accordingly, this level is the invoking level for this instance of the primitive type parser. After step 508, the operation continues to step 506, at which the computing system returns actual data (stored by execution of step 508) to the step (i.e. either step 414 of FIG. 4 or step 716 of FIG. 7) which invoked this instance of the type parser.

Figure 6:
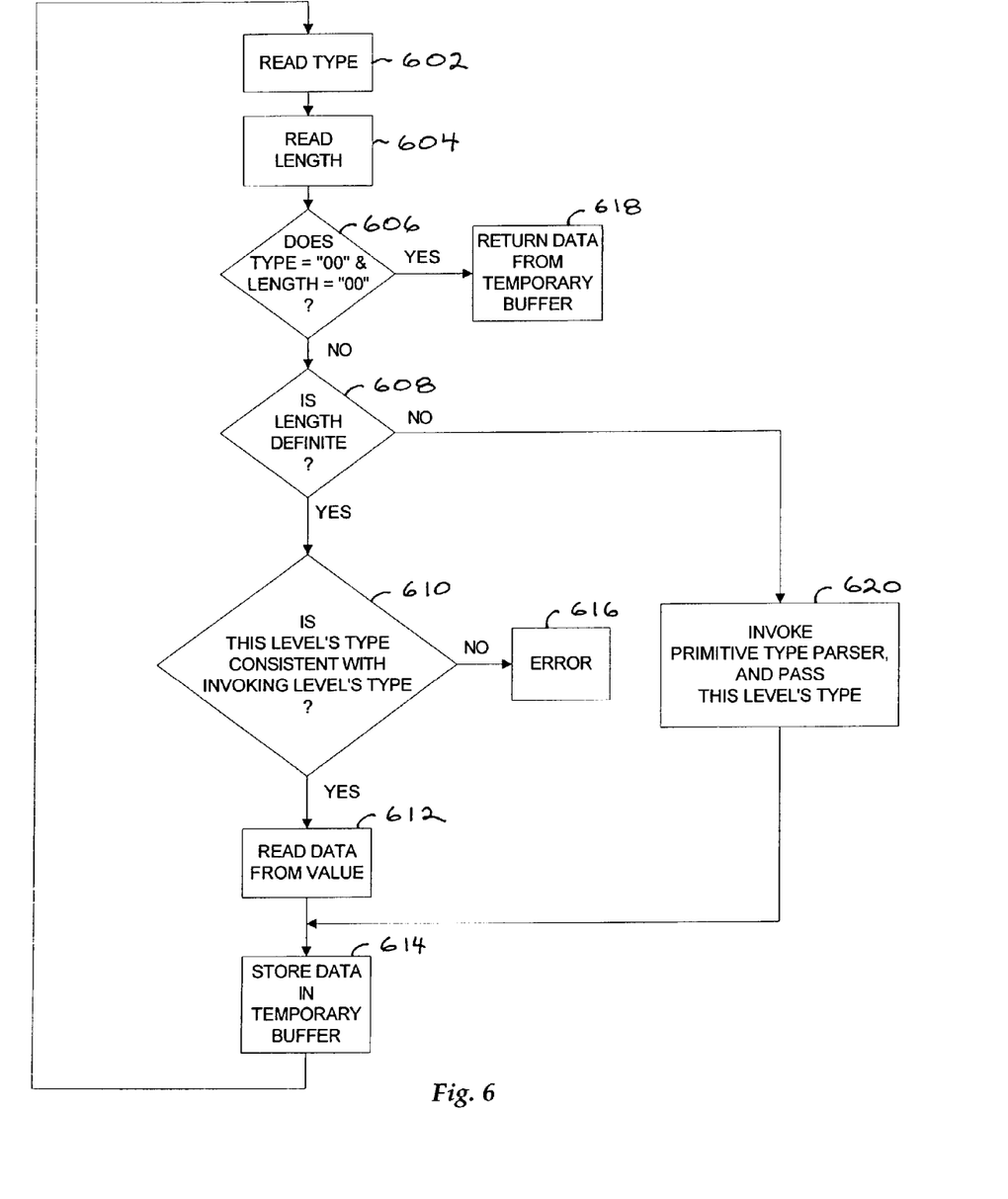
FIG. 6 is a flowchart of an operation of a primitive type parser, according to the second illustrative embodiment.

FIG. 6 is a flowchart of an operation of the primitive type parser, an instance of which is invoked at step 508 of FIG. 5. The computing system performs the decoding operation of FIG. 6, in response to various instructions of the primitive type parser. The operation starts at a step 602, in response to such invocation.

At step 602, the computing system reads the next Type. At a next step 604, the computing system reads the next Length.

At a next step 606, the computing system determines whether the Type is 00 and whether the Length is 00 (i.e. whether the end of data is delimited by a pair of zero octets). If the end of data is not yet delimited by a pair of zero octets, the operation continues from step 606 to a step 608, at which the computing system determines whether the Length is definite (i.e. whether Length is 80, which indicates indefinite length instead of definite length). If the Length is definite, the operation continues from step 608 to a step 610, at which the computing system determines whether the Type of the current level is consistent with the Type of the invoking level for this instance of the primitive type parser.

If the current level's Type is consistent with the invoking level's Type, the operation continues from step 610 to a step 612, at which the computing system reads actual data from the Value. After step 612, the operation continues to a step 614, at which the computing system stores the actual data in a temporary buffer (in addition to actual data, if any, already stored in the temporary buffer by previous execution(s) of step 614). The temporary buffer is associated with (and used in executing) this instance of the primitive type parser.

After step 614, the operation returns to step 602, at which the computing system reads the next Type. Referring again to step 610, if the current level's Type is not consistent with the invoking level's Type, the operation continues from step 610 to a step 616, at which the computing system outputs an error signal (indicating an error condition).

Referring again to step 606, if the end of data is delimited by a pair of zero octets, the operation continues from step 606 to a step 618, at which the computing system returns actual data (stored by previous execution(s) of step 614) from the temporary buffer to the step (i.e. step 508 of FIG. 5) which invoked this instance of the primitive type parser.

Referring again to step 608, if the Length is indefinite, the operation continues from step 608 to a step 620, at which the computing system invokes an additional instance of the primitive type parser of FIG. 6. In the course of invoking the additional instance of the primitive type parser, the computing system passes (to the additional instance of the primitive type parser) this level's Type. Accordingly, this level is the invoking level for the additional instance of the primitive type parser. After step 620, the operation continues to step 614.

At step 620, the additional (e.g. second) instance of the primitive type parser is identical in operation to the previously invoked (e.g. first) instance (discussed hereinabove in connection with FIG. 6) of the primitive type parser. The first instance is a first executable object, and the second instance is a second executable object.

In executing the second instance, the computing system (a) allocates a second temporary buffer (e.g. in executing the first instance, the temporary buffer discussed hereinabove is a first temporary buffer), (b) performs step 602 by reading the next Type, (c) performs step 604 by reading the next Length, and (d) eventually, performs step 618, at which the computing system returns actual data (stored by previous execution(s) of step 614 of the second instance) from the second temporary buffer to the step (i.e. step 620 of the first instance) which invoked the second instance. After such actual data from the second temporary buffer is returned to step 620 of the first instance, the operation continues to step 614 of the first instance, at which the computing system stores such actual data in the first temporary buffer (in addition to actual data, if any, already stored in the first temporary buffer by previous execution(s) of step 614 of the first instance). In that manner, the second temporary buffer is associated with (and used in executing) the second instance, in place of the first temporary buffer (which is used in executing the first instance).

Likewise, referring again to step 608, if the Length is indefinite in the second instance, the operation continues from step 608 to step 620 of the second instance, at which the computing system invokes a third instance of the primitive type parser of FIG. 6. The third instance is invoked in the same manner as the second instance. Accordingly, at step 620, the third instance of the primitive type parser is identical in operation to the first and second instances (discussed hereinabove in connection with FIG. 6) of the primitive type parser.

In executing the third instance, the computing system (a) allocates a third temporary buffer, (b) performs step 602 by reading the next Type, (c) performs step 604 by reading the next Length, and (d) eventually, performs step 618, at which the computing system returns actual data (stored by previous execution(s) of step 614 of the third instance) from the third temporary buffer to the step (i.e. step 620 of the second instance) which invoked the third instance. After such actual data from the third temporary buffer is returned to step 620 of the second instance, the operation continues to step 614 of the second instance, at which the computing system stores such actual data in the second temporary buffer (in addition to actual data, if any, already stored in the second temporary buffer by previous execution(s) of step 614 of the second instance). In that manner, the third temporary buffer is associated with (and used in executing) the third instance, in place of the first and second temporary buffers (which are used in executing the first and second instances, respectively).

Figure 7:
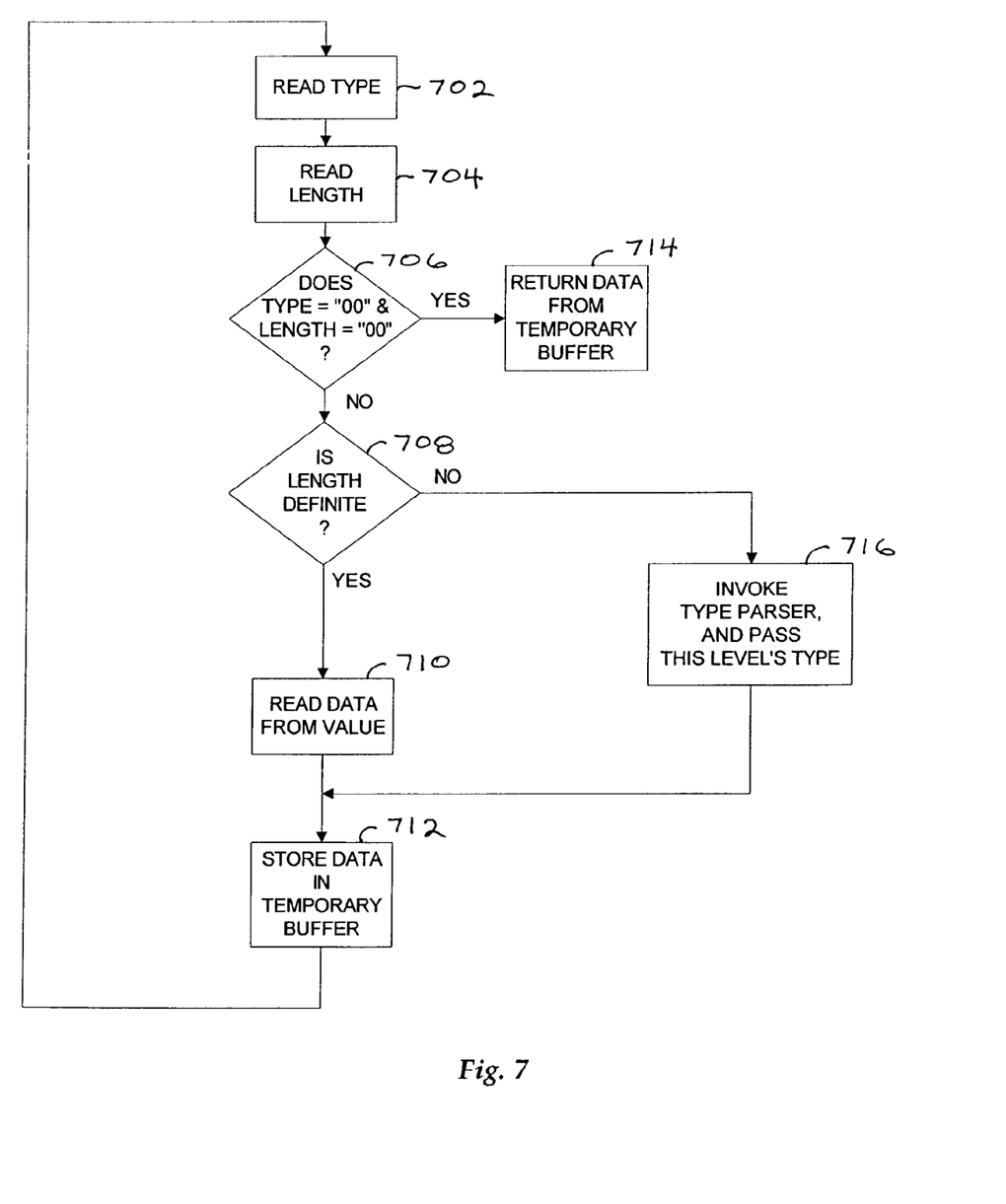
FIG. 7 is a flowchart of an operation of a non-primitive type parser, according to the second illustrative embodiment.

FIG. 7 is a flowchart of an operation of the non-primitive type parser, an instance of which is invoked at step 504 of FIG. 5. The computing system performs the decoding operation of FIG. 7, in response to various instructions of the non-primitive type parser. The operation starts at a step 702, in response to such invocation. In FIG. 7, (a) steps 702-708 are identical to steps 602-608 of FIG. 6, (b) step 710 is identical to step 612 of FIG. 6, (c) step 712 is identical to step 614 of FIG. 6, and (d) step 714 is identical to step 618 of FIG. 6.

Accordingly, at step 702, the computing system reads the next Type. At a next step 704, the computing system reads the next Length. At a next step 706, the computing system determines whether the Type is 00 and whether the Length is 00 (i.e. whether the end of data is delimited by a pair of zero octets). If the end of data is not yet delimited by a pair of zero octets, the operation continues from step 706 to a step 708, at which the computing system determines whether the Length is definite. If the Length is definite, the operation continues from step 708 to a step 710, at which the computing system reads actual data from the Value.

After step 710, the operation continues to a step 712, at which the computing system stores the actual data in a temporary buffer (in addition to actual data, if any, already stored in the temporary buffer by previous execution(s) of step 712). The temporary buffer is associated with (and used in executing) this instance of the non-primitive type parser. After step 712, the operation returns to step 702, at which the computing system reads the next Type.

Referring again to step 706, if the end of data is delimited by a pair of zero octets, the operation continues from step 706 to a step 714, at which the computing system returns actual data (stored by previous execution(s) of step 712) from the temporary buffer to the step (i.e. step 504 of FIG. 5) which invoked this instance of the non-primitive type parser.

Referring again to step 708, if the Length is indefinite, the operation continues from step 708 to a step 716, at which the computing system invokes an additional instance of the type parser of FIG. 5. In the course of invoking the additional instance of the type parser, the computing system passes (to the additional instance of the type parser) this level's Type. Accordingly, this level is the invoking level for the additional instance of the type parser. After step 716, the operation continues to step 712.

At step 716, the additional (e.g. second) instance of the type parser is identical in operation to the previously invoked (e.g. first) instance (discussed hereinabove in connection with FIG. 5) of the type parser. The first instance is a first executable object, and the second instance is a second executable object.

Similarly, as discussed hereinabove in connection with the first, second and third instances of the primitive type parser, any number of additional instances may be invoked of (a) the type parser of FIG. 5, (b) the primitive type parser of FIG. 6, and (c) the non-primitive type parser of FIG. 7. In that manner, by recursively invoking multiple instances of such parsers, the computing system operates without storing certain state information that would otherwise be associated with various parsing steps, and the computing system is able to parse encodings that have numerous levels of indefinite length, in addition to at least one level of definite length, such as the following example encoding.

| T  | L  | V  |    |    |                  |
|----|----|----|----|----|------------------|
| 24 | 80 |    |    |    |                  |
|    |    | T  | L  | V  |                  |
|    |    | 24 | 80 |    |                  |
|    |    |    |    | T  | L V              |
|    |    |    |    | 04 | 08 0011223344556677 |
|    |    |    |    | 04 | 08 8899AABBCCDDEEFF |
|    |    |    |    | 00 | 00               |
|    |    | 24 | 80 |    |                  |
|    |    |    |    | T  | L V              |
|    |    |    |    | 24 | 80               |
|    |    |    |    |    | T L V            |
|    |    |    |    |    | 04 08 0011223344556677 |
|    |    |    |    |    | 04 08 8899AABBCCDDEEFF |
|    |    |    |    |    | 00 00            |
|    |    |    |    | 00 | 00               |
|    |    | 00 | 00 |    |                  |

As shown in this example, a lower level of indefinite length may be nested within a higher level of indefinite length, so that the higher level includes the lower level. Also, a lower level of definite length may be nested within a higher level of indefinite length, so that the higher level includes the lower level.

This example of multi-level indefinite length encoding would not be properly parsed by the decoding operation of FIG. 3. Nevertheless, with practical revisions to software programming code (but without revising the application programming interface ("API")), the decoding operation of FIG. 3 is readily modified to achieve the more flexible decoding operation of FIGS. 4, 5, 6 and 7, as discussed hereinabove by replacing steps 314-324 of FIG. 3 (indicated by dashed enclosure 326) with step 414. Accordingly, steps 402-412 of FIG. 4 (and steps 302-312 of FIG. 3) form a definite length parser, which is a software application having various instructions. Moreover, with the decoding operation of FIGS. 4, 5, 6 and 7, the computing system detects an error if a number of delimiter zero octet pairs fails to match the number of indefinite length encoding levels, thereby avoiding a potential source of infinite loop error.

Referring again to FIG. 2, in the illustrative embodiment, computer 202 is an IBM-compatible computer that executes Microsoft Windows NT operating system ("OS") software, or alternatively is any computer that executes any OS. All Microsoft products identified herein are available from Microsoft Corporation, One Microsoft Way, Redmond, Wash. 98052-6399, telephone (425) 882-8080. For example, computer 202 includes (a) a network interface (e.g. asynchronous transfer mode ("ATM") circuitry) for communicating between computer 202 and network 108 and (b) a memory device (e.g. random access memory ("RAM") device and read only memory ("ROM") device) for storing information (e.g. instructions executed by computer 202 and data operated upon by computer 202 in response to such instructions).

Accordingly, computer 202 is connected to network 108, input devices 204, display device 208, print device 210, computer-readable medium 212, and storage device 214, as shown in FIG. 2. Computing system 102 and user 206 operate in association with one another.

For example, user 206 operates input devices 204 in order to output information to computer 202, and computer 202 receives such information from input devices 204. Moreover, in response to signals from computer 202, display device 208 displays visual images, and a user (e.g. user 206) views such visual images. Also, in response to signals from computer 202, print device 210 prints visual images on paper, and a user (e.g. user 206) views such visual images.

Input devices 204 include, for example, a conventional electronic keyboard and a pointing device such as a conventional electronic "mouse," rollerball or light pen. User 206 operates the keyboard to output alphanumeric text information to computer 202, and computer 202 receives such alphanumeric text information from the keyboard. User 206 operates the pointing device to output cursor-control information to computer 202, and computer 202 receives such cursor-control information from the pointing device.

In the illustrative embodiment, computer-readable medium 212 is a floppy diskette. Computer-readable medium 212 and computer 202 are structurally and functionally interrelated with one another, as discussed further hereinbelow. Each computing device of the illustrative embodiment is structurally and functionally interrelated with a respective computer-readable medium, similar to the manner in which computer 202 is structurally and functionally interrelated with computer-readable medium 212. In that manner, computer-readable medium 212 is a representative one of such computer-readable media, including for example but not limited to storage device 214.

Computer-readable medium 212 stores (or encodes, or records, or embodies) functional descriptive material (e.g. including but not limited to computer programs (also referred to as computer applications) and data structures). Such functional descriptive material imparts functionality when encoded on computer-readable medium 212. Also, such functional descriptive material is structurally and functionally interrelated to computer-readable medium 212.

Within such functional descriptive material, data structures define structural and functional interrelationships between such data structures and computer-readable medium 212 (and other aspects of computing system 102 and system 100). Such interrelationships permit the data structures' functionality to be realized. Also, within such functional descriptive material, computer programs define structural and functional interrelationships between such computer programs and computer-readable medium 212 (and other aspects of computing system 102 and system 100). Such interrelationships permit the computer programs' functionality to be realized.

For example, computer 202 reads (or accesses, or copies) such functional descriptive material from computer-readable medium 212 into the memory device of computing system 102, and computing system 102 performs its operations (as discussed elsewhere herein) in response to such material which is stored in the memory device of computing system 102. More particularly, computing system 102 performs the operation of processing a computer application (that is stored, encoded, recorded or embodied on a computer-readable medium) for causing computing system 102 to perform additional operations (as discussed elsewhere herein). Accordingly, such functional descriptive material exhibits a functional interrelationship with the way in which computing system 102 executes its processes and performs its operations.

Further, the computer-readable medium is an apparatus from which the computer application is accessible by computer 202, and the computer application is processable by computer 202 for causing computing system 102 to perform such additional operations. In addition to reading such functional descriptive material from computer-readable medium 212, computing system 102 is capable of reading such functional descriptive material from (or through) network 108 which is also a computer-readable medium (or apparatus). Moreover, the memory device of computing system 102 is itself a computer-readable medium (or apparatus).

Although FIG. 1 shows only three computing systems (i.e. computing systems 102, 104 and 106), it should be understood that other computing systems (e.g. substantially identical to computing system 102) are connected to network 108. Each of such other computing systems operates in association with a respective human user, similar to the manner in which computing system 102 operates in association with user 206.

While the inventions have been shown and described with reference to particular embodiments thereof, it will be understood by those skilled in the art that the foregoing and other changes in form and detail may be made therein without departing from the spirit and scope of the inventions.

What is claimed is:

1. A system, comprising:
    a computing device for:
        receiving an encoding that includes a first level of indefinite length, wherein the first level includes a second level of indefinite length;
        in response to instructions of a first instance of a parser, parsing the first level; and
        in response to instructions of a second instance of the parser, parsing the second level, the second instance being invoked by the first instance.

2. The system of claim 1 wherein the encoding is a BER encoding.

3. The system of claim 1 wherein the encoding includes at least one level of definite length.

4. The system of claim 3 wherein the computing device is for:
    in response to instructions of a definite length parser, parsing the level of definite length.

5. The system of claim 3 wherein the first level includes the level of indefinite length.

6. The system of claim 1 wherein the computing device is a first computing device, and wherein the first computing device receives the encoding from a second computing device.

7. The system of claim 1 wherein the second level includes a third level of indefinite length, and wherein the computing device is for:
    in response to instructions of a third instance of the parser, parsing the third level, the third instance being invoked by the second instance.

8. A system, comprising:
    a first computing device for:
        from a second computing device, receiving a BER encoding that includes a first level of indefinite length, wherein the first level includes a second level of indefinite length, and the second level includes a third level of indefinite length;
        in response to instructions of a first instance of a parser, parsing the first level;
        in response to instructions of a second instance of the parser, parsing the second level, the second instance being invoked by the first instance; and
        in response to instructions of a third instance of the parser, parsing the third level, the third instance being invoked by the second instance.

9. The system of claim 8 wherein the encoding includes at least one level of definite length, and wherein the first computing device is for:
    in response to instructions of a definite length parser, parsing the level of definite length.

10. A method performed by a computing device, comprising:
    receiving an encoding that includes a first level of indefinite length, wherein the first level includes a second level of indefinite length;
    in response to instructions of a first instance of a parser, parsing the first level; and
    in response to instructions of a second instance of the parser, parsing the second level, the second instance being invoked by the first instance.

11. The method of claim 10 wherein the encoding is a BER encoding.

12. The method of claim 10 wherein the encoding includes at least one level of definite length.

13. The method of claim 12 and comprising:
    in response to instructions of a definite length parser, parsing the level of definite length.

14. The method of claim 12 wherein the first level includes the level of indefinite length.

15. The method of claim 10 wherein the computing device is a first computing device, and comprising:
    receiving the encoding from a second computing device.

16. The method of claim 10 wherein the second level includes a third level of indefinite length, and comprising:
    in response to instructions of a third instance of the parser, parsing the third level, the third instance being invoked by the second instance.

17. A method performed by a first computing device, comprising:
    from a second computing device, receiving a BER encoding that includes a first level of indefinite length, wherein the first level includes a second level of indefinite length, and the second level includes a third level of indefinite length;
    in response to instructions of a first instance of a parser, parsing the first level;
    in response to instructions of a second instance of the parser, parsing the second level, the second instance being invoked by the first instance; and in response to instructions of a third instance of the parser, parsing the third level, the third instance being invoked by the second instance.

18. The method of claim 17 wherein the encoding includes at least one level of definite length, and comprising:

in response to instructions of a definite length parser, parsing the level of definite length.

19. A computer program product, stored on a computer-readable storage device comprising:

a computer program processable by a computing device for causing the computing device to:

receive an encoding that includes a first level of indefinite length, wherein the first level includes a second level of indefinite length;

in response to instructions of a first instance of a parser, parse the first level; and in response to instructions of a second instance of the parser, parse the second level, the second instance being invoked by the first instance; and apparatus from which the computer program is accessible by the computing device.

20. The computer program product of claim 19 wherein the encoding is a BER encoding.

21. The computer program product of claim 19 wherein the encoding includes at least one level of definite length.

22. The computer program product of claim 21 wherein the computer program is processable by the computing device for causing the computing device to:

in response to instructions of a definite length parser, parse the level of definite length.

23. The computer program product of claim 21 wherein the first level includes the level of indefinite length.

24. The computer program product of claim 19 wherein the computing device is a first computing device, and wherein the computer program is processable by the first computing device for causing the first computing device to receive the encoding from a second computing device.

25. The computer program product of claim 19 wherein the second level includes a third level of indefinite length, and wherein the computer program is processable by the computing device for causing the computing device to:

in response to instructions of a third instance of the parser, parse the third level, the third instance being invoked by the second instance.

26. A computer program product, stored on a computer-readable storage device comprising:

a computer program processable by a first computing device for causing the first computing device to:

from a second computing device, receive a BER encoding that includes a first level of indefinite length, wherein the first level includes a second level of indefinite length, and the second level includes a third level of indefinite length;

in response to instructions of a first instance of a parser, parse the first level;

in response to instructions of a second instance of the parser, parse the second level, the second instance being invoked by the first instance; and in response to instructions of a third instance of the parser, parse the third level, the third instance being invoked by the second instance; and apparatus from which the computer program is accessible by the first computing device.

27. The computer program product of claim 26 wherein the encoding includes at least one level of definite length, and wherein the computer program is processable by the first computing device for causing the first computing device to:

in response to instructions of a definite length parser, parse the level of definite length.

\* \* \* \* \*